United States Patent
Enke et al.

(10) Patent No.: US 11,981,430 B2
(45) Date of Patent: May 14, 2024

(54) VARIABLE CONDITION MOTOR CONTROLLER

(71) Applicant: GoPro, Inc., San Mateo, CA (US)

(72) Inventors: Joseph Anthony Enke, San Carlos, CA (US); Benjamin Tankersley, San Mateo, CA (US); Jean-Bernard Berteaux, Villars-sur-Glâne (CH); Axel Murguet, Zurich (CH); Garance Bruneau, Zurich (CH)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/142,773

(22) Filed: May 3, 2023

(65) Prior Publication Data
US 2023/0271702 A1 Aug. 31, 2023

Related U.S. Application Data

(63) Continuation of application No. 17/331,962, filed on May 27, 2021, now Pat. No. 11,673,665, which is a continuation of application No. 16/673,355, filed on Nov. 4, 2019, now Pat. No. 11,021,248, which is a continuation of application No. 15/439,871, filed on Feb. 22, 2017, now Pat. No. 10,464,670.

(51) Int. Cl.
*B64C 39/02* (2023.01)
*G05D 1/00* (2006.01)
*B64U 10/13* (2023.01)

(52) U.S. Cl.
CPC .......... *B64C 39/024* (2013.01); *G05D 1/063* (2013.01); *G05D 1/0858* (2013.01); *B64U 10/13* (2023.01); *B64U 2201/20* (2023.01)

(58) Field of Classification Search
CPC .... G05D 1/0066; G05D 1/0011; G05D 1/101; B64C 39/024; B64C 2201/027; B64C 2201/146
USPC ........................................................... 701/2
See application file for complete search history.

(56) References Cited

U.S. PATENT DOCUMENTS

| | | |
|---|---|---|
| 6,456,907 B1 | 9/2002 | Reckdahl |
| 10,464,670 B2 | 11/2019 | Enke |
| 11,021,248 B2 | 6/2021 | Enke |

(Continued)

FOREIGN PATENT DOCUMENTS

| | | | |
|---|---|---|---|
| CN | 201220659167 | | 12/2012 |
| CN | 202956122 | * | 5/2013 |

(Continued)

*Primary Examiner* — Muhammad Shafi
(74) *Attorney, Agent, or Firm* — Young Basile Hanlon & MacFarlane, P.C.

(57) ABSTRACT

An aerial vehicle, comprising: one or more motors, one or more sensors, and a flight sub-system. The one or more sensors configured to detect data. The flight sub-system includes an attitude controller module; a rate controller module; and a compensator module. The compensator module is configured to: determine a maximum RPM of the one or more motors or a maximum torque of the one or more motors; receive a torque vector from the rate controller module; determine a rotational speed of the one or more motors to generate a desired flight orientation based upon the torque vector; and consider sensor data from the one or more sensors to adjust the rotational speed of the one or more motors.

17 Claims, 5 Drawing Sheets

(56) References Cited

U.S. PATENT DOCUMENTS

| | | | |
|---|---|---|---|
| 2007/0222674 A1* | 9/2007 | Tan | G06Q 10/087 |
| | | | 342/357.32 |
| 2015/0017921 A1* | 1/2015 | Choi | B60L 3/0069 |
| | | | 455/66.1 |
| 2016/0063987 A1 | 3/2016 | Xu | |
| 2016/0216718 A1* | 7/2016 | Powell | F04D 27/004 |
| 2018/0201370 A1 | 7/2018 | Yang | |
| 2018/0239353 A1 | 8/2018 | Enke | |
| 2020/0062397 A1 | 2/2020 | Enke | |
| 2021/0354822 A1 | 11/2021 | Enke | |

FOREIGN PATENT DOCUMENTS

| | | | |
|---|---|---|---|
| CN | 1064-44813 A | * | 2/2017 |
| CN | 106444813 A | | 2/2017 |

* cited by examiner

VARIABLE CONDITION MOTOR CONTROLLER

CROSS REFERENCE TO RELATED APPLICATION(S)

This application is a continuation of U.S. application Ser. No. 17/331,962, filed May 27, 2021, which is a continuation of U.S. application Ser. No. 16/673,355, filed Nov. 4, 2019, now U.S. Pat. No. 11,021,248, which is a continuation of U.S. application Ser. No. 15/439,871, filed Feb. 22, 2017, now U.S. Pat. No. 10,464,670, all of which are incorporated by reference in their entirety.

TECHNICAL FIELD

The disclosure generally relates to the field of flight controller systems, and more specifically to the control of an aerial vehicle while taking into account current environmental conditions.

BACKGROUND

Controller systems, such as a flight controller system, are commonly used in aerial vehicles (e.g., drones). When in the air, an aerial vehicle often encounters changing environmental conditions that affect the performance of the aerial vehicle. As one example, the aerial vehicle may experience environmental conditions that gradually change during flight including the air pressure, temperature, humidity, and the like. As another example, the aerial vehicle may experience sudden changes in environmental conditions such as a gust of wind or inclement weather conditions. Current controller systems of aerial vehicles are ill-equipped to handle the changing environmental conditions. For example, in response to environmental changes, conventional controller systems often calculate the motor input that is provided to the thrust motors in order to compensate for the environmental changes. However, conventional controller systems often calculate motor inputs that are unachievable and non-feasible. As such, the performance of the aerial vehicle often suffers.

SUMMARY

The present teachings provide: an aerial vehicle with one or more motors, one or more sensors, and a control system. The one or more sensors are configured to detect data. The control system is configured to generate torque values based on the data. The control system is configured to determine sub-torque values including a core sub-torque value that represents a minimum amount of torque to maintain the aerial vehicle at a hover status. The control system is configured to generate revised torque values by validating the sub-torque values. The control system is configured to determine a motor speed for each motor based on the revised torque values.

The present teachings provide: a method of controlling an aerial vehicle including detecting, generating torque values, determining sub-torque value, generating revised torque values, a determining a motor speed. The detecting includes detecting environmental conditions. The generating torque values is derived from flight parameters based on the environmental conditions. The determining sub-torque values includes one that represents a minimum amount of torque to maintain the aerial vehicle. The generating revised torque values is done by validating the sub-torque values. The determining a motor speed for each motor of the aerial vehicle is based on the revised torque values.

The present teachings provide: a method including generating torque values, determining sub-torque values, generating revised torque values, and determining a motor speed. The generating torque values is based on received data. The determining sub-torque values include a value that represents a minimum amount of torque to maintain a vehicle at a hover status. The generating revised torque values by validating the sub-torque values. The determining a motor speed for each motor of the vehicle based on the revised torque values.

The present teachings provide: an aerial vehicle, comprising: one or more motors, one or more sensors, and a flight sub-system. The one or more sensors configured to detect data. The flight sub-system includes an attitude controller module; a rate controller module; and a compensator module. The compensator module is configured to: determine a maximum RPM of the one or more motors or a maximum torque of the one or more motors; receive a torque vector from the rate controller module; determine a rotational speed of the one or more motors to generate a desired flight orientation based upon the torque vector; and consider sensor data from the one or more sensors to adjust the rotational speed of the one or more motors.

The present teachings provide: a method of controlling an aerial vehicle. Detecting environmental conditions with one or more sensors. Determining a maximum RPM of one or more motors or a maximum torque of the one or more motors with a compensator module. Determining a torque vector with a rate controller module. Providing the torque vector from the rate controller module to the compensator module. Calculating a rotational speed of the one or more motors. Generating a desired flight orientation of the aerial vehicle based upon the torque vector. Adjusting the rotational speed of the one or more motors based upon the environmental conditions from the one or more sensors.

The present teachings provide: an aerial vehicle comprising: one or more motors; one or more sensors configured to detect environmental conditions; and a flight control subsystem. The flight control subsystem comprises: a compensator module. The compensator module comprises a conditions adjustment module configured to adjust one or more factors of the one or more motors based upon the environmental conditions that are detected by the one or more sensors; an iterative mixing module configured to adjust torque values associated with the one or more motors; and a converter module configured to change a speed of the one or more motors based upon the torque values from the iterative mixing module.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG. 1) illustrates an example configuration of a remote controlled aerial vehicle in communication with a remote controller, according to one example embodiment.

DETAILED DESCRIPTION

Figure 1:
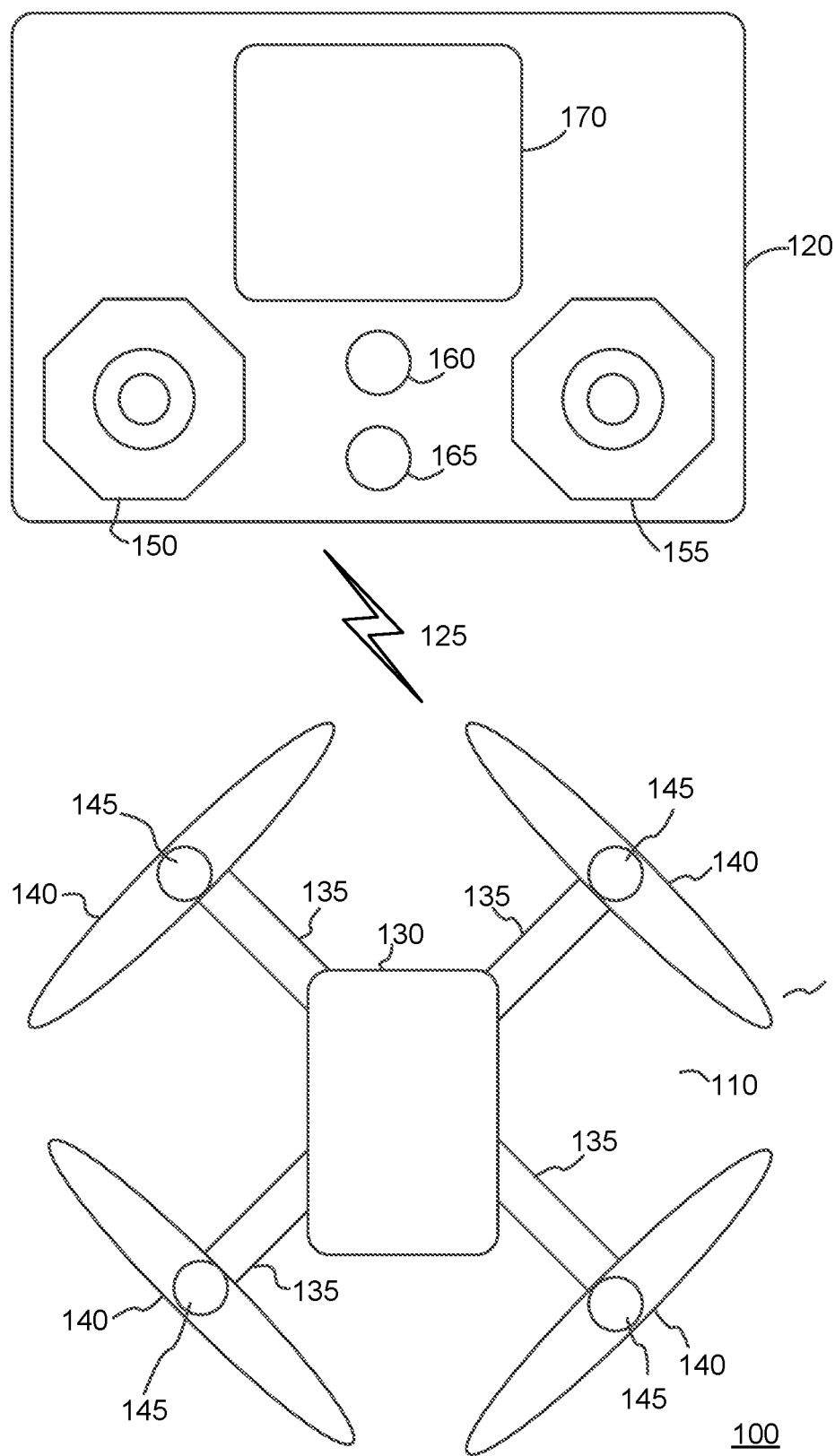

The Figures and the following description relate to preferred embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several embodiments, examples of which are illustrated in the accompanying figures. It is noted that whenever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A controller system of an aerial vehicle is configured to respond to changing environmental conditions in an efficient manner Namely, the controller system may be configured to receive environmental data from one or more sensors of the aerial vehicle and ensures that the aerial vehicle appropriately considers the current environmental conditions while in flight. For example, the controller system may adjust limits of the aerial vehicle such as the maximum rotations per minute (RPM) of each propeller given the environmental conditions, which may include the current air pressure, air temperature, and humidity. Therefore, when the aerial vehicle may receive a flight input (e.g., from a remote controller to change flight parameters such as pitch, roll or yaw of the aerial vehicle), the controller system ensures that the flight input is appropriately converted to motor inputs to each of the thrust motors of the aerial vehicle without exceeding the limits of the aerial vehicle that were adjusted based on the current environmental conditions.

In various example embodiments, the controller system may perform an iterative process in determining each of the motor inputs to ensure that the adjusted limits are not exceeded. For example, for each torque value that corresponds to a thrust, pitch, roll, or yaw of the aerial vehicle, the controller system may generate and determine a priority order for sub-torque values. Sub-torque values ranked first are highly important in ensuring that the aerial vehicle does not fail in view of a provided flight input (or sudden environmental input such as a gust of wind). Therefore, the sub-torque values ranked first are highly likely to be fulfilled whereas later ranked sub-torque values may be accordingly scaled back to ensure that the adjusted limits of the aerial vehicle are not exceeded. The controller system may determine a motor input for each thrust motor according to the fulfilled and/or scaled back sub-torque values. Scaling back certain sub-torque values may ensure that each thrust motor that receives a motor input can readily achieve the RPM that is needed in order to achieve the flight parameters from the flight input, given the current environmental conditions that the aerial vehicle is experiencing.

Example System Configuration

The descriptions herein may be in the context of a remote controlled aerial vehicle (or drone), for example, a rotary wing (or rotary blade), such as a quadcopter or helicopter, a fixed wing aircraft, a turbojet aircraft, or a rocket propelled aircraft. In addition, the remote controlled vehicles may have hobby sized form factors. Remote control aerial vehicles may sometimes be referred to as unmanned aerial vehicles (UAVs) or drones and in this context may include camera units/hardware for capturing images and/or videos.

Turning now to Figure (FIG. 1, it illustrates an example aerial capture platform (or system) 100. The aerial capture platform 100 may include a remote controlled aerial vehicle 110 in communication with a remote controller 120. The aerial vehicle 110 and the remote controller 120 may be communicatively coupled through a wireless link 125. The wireless link 125 may be a Wi-Fi link, cellular (e.g., long term evolution (LTE), 3G, 4G, 5G) or other wireless communication link (e.g., Bluetooth, Zigbee). In this example, the aerial vehicle 110 is illustrated as multi-rotary blade aerial vehicle. Here, the multi-rotary blade aerial vehicle is illustrated with four rotary blade and thus, also may be referenced as a quadcopter. Also in this example, the remote controller 120 is illustrated as a dedicated remote controller, but the principles described herein may apply to other devices that may operate as a remote controller, for example, a smartphone, tablet, and/or a laptop.

The aerial vehicle 110 in this example includes a housing (or body) 130, four arms 135, and four propellers 140 (which may be in an orientation different from the depicted orientation), each propeller 140 being driven by a thrust motor 145. In other embodiments, the aerial vehicle 110 may have more or less propellers 140, each corresponding to an arm 135. As shown in FIG. 1, each thrust motor 145 is coupled with a corresponding propeller 140 at the center of the propeller 140. The housing 130 may have one or more cavities for a payload. The payload may include, for example, electronic circuitry (e.g., controls and processing components), batteries, and/or sensors. The payload may include mechanisms such as a parachute. The parachute may be in a portion of the housing 130 that may open so that the parachute may deploy in certain pre-determined situations. The parachute and/or corresponding portion of the housing 130 may couple with electronics that may provide the logic for deployment of the parachute. The housing 130 may include a communication system (which may include corresponding electronics and/or firmware) and a control system (which may include corresponding electronics and/or firmware). The communication system may be used to wirelessly communicate with a remote controller (e.g., the remote controller 120) or other interfaces on the aerial vehicle 110. The control system may be used/configured to control operations of various systems on the aerial vehicle 110, for example, a flight subsystem, a telemetric subsystem, and other such systems.

In one embodiment, the control system dynamically adjusts the input that is sent to the thrust motors 145 which drive the propellers 140 in order to ensure optimal flight characteristics of the aerial vehicle 110. The control system may adjust the input to the thrust motors 145 in response to various external conditions (e.g., wind gust, changing humidity, changing elevation) in order to avoid undesirable responses from the aerial vehicle. These flight characteristics may include limiting, setting to within a threshold, or otherwise confirm various characteristics of the aerial vehicle, such as speed, acceleration, judder, yaw, pitch, roll, altitude, position, and so on. Additionally, the control system may be able to dynamically determine using sensors or receive instructions regarding the current mode of the aerial vehicle, and respond with an adjustment to the signal being sent to the thrust motors 145. Additional details regarding the control system is described further in detail with respect to FIG. 2.

Each arm 135 of the aerial vehicle 110 may be removably coupled with the housing 130. In addition, each arm 135 is movable and may fold or pivot/rotate toward the housing 130 when the aerial vehicle 110 is not operational for flight and may fold back away from the housing 130 when the aerial vehicle 110 is operational for flight. The arm 135 may be comprised of multiple members, with each member independently foldable or rotatable. In addition, each arm 135 includes a thrust motor 145 (which may include a rotor) that may mechanically, and removably, couple with a propeller 140 to create a rotary assembly.

The thrust motor 145 spins the propeller 140 in an appropriate direction to allow the aerial vehicle 110 to move based on an executed command. For example, when the rotary assembly is operational, all the propellers 140 spin in appropriate directions and/or at speeds to allow the aerial vehicle 110 to lift (take off), tilt, turn, land, hover, and/or otherwise move (up, down, forward, reverse (or backward), etc.) in flight. In one embodiment, each propeller may also have adjustable pitch. The profile of the propellers 140 may be designed such that they support an optimal or lowest possible rotations per minute (RPM) that is needed to achieve the lift and other flight characteristics of the aerial vehicle (e.g., speed). This allows the aerial vehicle to achieve the desired flight characteristics while minimizing noise. To achieve a lower RPM, the rotors may lengthened (e.g., to the maximum length possible without interfering with other rotors), ducted, the number of blades may be increased, the area of the blades may be increased, the pitch of the blades may be increased, and so on.

In addition the aerial vehicle 110 may include landing gear (not shown) on an underside of the housing 130. The landing gear may be configured to fold toward the housing 110 when the aerial vehicle 110 is in flight. The landing gear may extend outward away from the housing 110 when the aerial vehicle 110 is at rest on a surface.

The remote controller 120 may include a first control panel 150 and a second control panel 155 (collectively referred to as "control panels 150, 155"), an ignition/start button 160, a return button 165 and a display 170. It is noted that more or less control features and buttons may be included (e.g., a shutdown button, autopilot button, etc). The remote controller 120 may be used to control operation of the aerial vehicle 110. This operation may include pitch, roll, and yaw control, as well as control for translation in three dimensions (e.g., up, down) for the aerial vehicle 110 in addition to other functions.

The control panels 150, 155 may be used by a user to initiate control operations. The control panels 150, 155 may be mechanical (e.g., joystick, roller ball, etc.) or solid state (e.g., touch pad). For example, the first control panel 150 may be used (in part) to control "up-down" direction (e.g. lift and landing) of the aerial vehicle 110. The second control panel 155 may be used (in part) to control "forward-reverse" (e.g., thrust/drag) direction of the aerial vehicle 110. In addition, a combination of the control panels 150, 155 with another controller mechanism (e.g., a wheel), may be used for "left-right" and/or hover movement. It is noted that these are just examples and that the control panels 150, 155 may be assigned other or different functions (e.g., yaw, pitch, roll).

The ignition button 160 may be used to remotely turn on and/or start (as well as turn off and/or pause operation of) the aerial vehicle 110 components. For example, a single press of the ignition button 160 may start operation of a first set of components (e.g., sensors and lighting) on the aerial vehicle 110, a second press may start operation of a second set of components (e.g., the rotary assembly (e.g., start the propellers 140)), on the aerial vehicle 110, and holding the ignition button 160 for a certain period of time (e.g. 5 seconds) may shut down the aerial vehicle 110. The return button 165 (or the return to home (RTH) or come home button) may be used to override the controls of the remote controller 120 and transmit instructions to the aerial vehicle 110 to return to a predefined location.

The ignition button 160 and the return button 165 may be mechanical and/or touch sensitive (non-mechanical) buttons. In addition, each button 160, 165 may be illuminated with one or more light emitting diodes (LED) to provide additional details. For example, the LED may switch from one visual state (e.g., color) to another to indicate with respect to the ignition button 160 whether the aerial vehicle 110 is ready to fly (e.g., lit green) or not (e.g., lit red). The LED also may provide visual indicators corresponding to aerial vehicle 110 operation in flight, for example, if it is in an override mode on return path (e.g., lit yellow) or has a battery power level below a predefined threshold (e.g., lit green when above a first threshold, lit yellow when just below that threshold, and lit red below a lower threshold). It also is noted that the remote controller 120 may include other dedicated hardware buttons and/or switches and those buttons and switches may be mechanical and/or solid state buttons and switches. For example, another button may be added to transmit signals/instructions to the aerial vehicle 110 to deploy the parachute.

The remote controller 120 may include dedicated buttons corresponding to functions on the remote controlled aerial vehicle 110, for example, a camera shutter button for signaling (or triggering) taking still or video images, changing image capture resolution, changing frame rate, etc. Other buttons can be used for functions such as camera controls, including control settings, for example, tagging images, transmitting (or sharing) captured images, etc.

The remote controller 120 may include a screen (or display) 170. The screen 170 provides for visual display. The screen 170 may be a touch sensitive screen. The screen 170 may be, for example, a liquid crystal display (LCD), an LED display, an organic LED (GEED) display, or a plasma screen, etc. The screen 170 may allow for display of information related to the remote controller 120, for example, menus for configuring the remote controller 120 and/or remotely configuring the aerial vehicle 110, and/or controlling a camera and/or gimbal 190 coupled with the aerial vehicle 110. The screen 170 can display images or video captured from a camera coupled with the aerial vehicle 110.

Example Flight Control System for Aerial Vehicle

Figure 2:
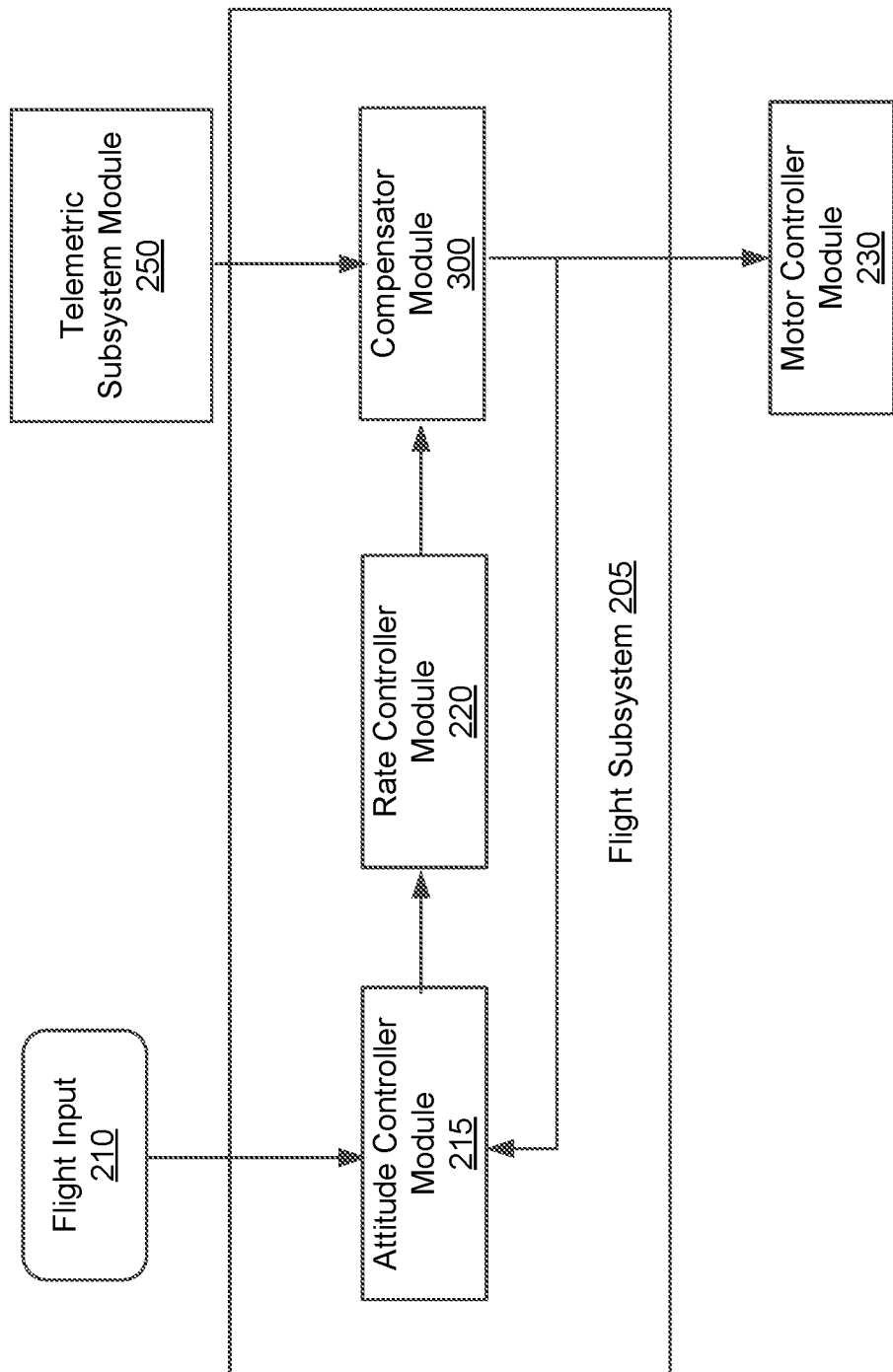
FIG. 2 illustrates an example block diagram and process flow of a control system of the aerial vehicle, according to one example embodiment.

Referring now to FIG. 2, it illustrates an example block diagram and process flow of a control system 200 of the aerial vehicle 110, according to one example embodiment. As previously described, the control system 200 may include corresponding electronics and/or firmware that are housed within the housing 130 of the aerial vehicle 110. The control system 200 may include a telemetric subsystem module 250, a flight subsystem 205, and a motor controller module 230.

Figure 5:
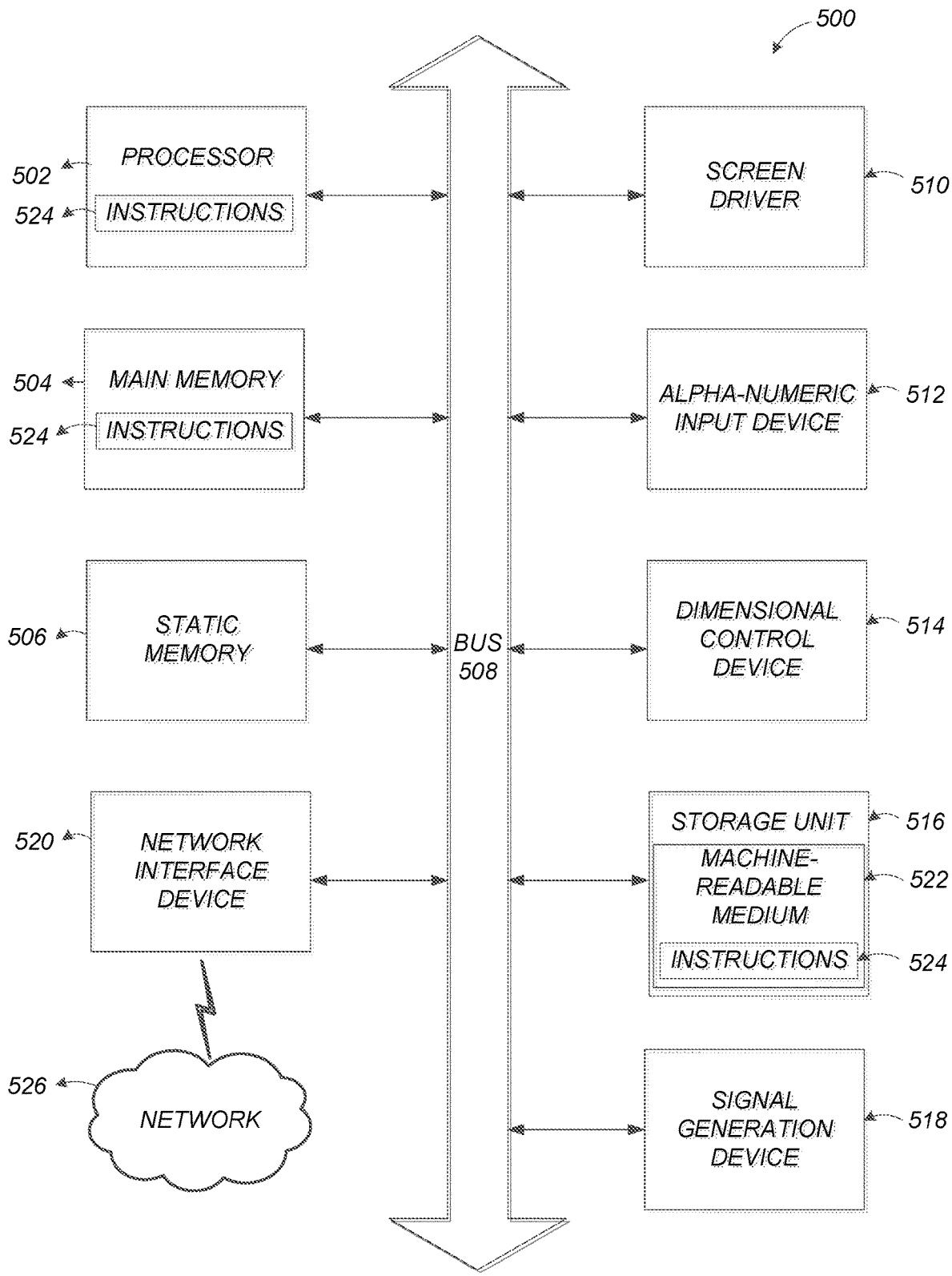
FIG. 5 illustrates an example machine for use with a system of an aerial vehicle, according to one example embodiment.

The components of the control system 200 may be embodied in hardware, software, or a combination thereof. The software, which may include firmware, may be referenced as program code, computer program product, or program instructions, and may be comprised of one or more instructions. Software may include an operating system, which provides an interface to a processor, and on which software applications run (or execute). Software may be executed by one or more processors within the aerial vehicle 110. A processor also may include, for example, controllers, application specific integrated circuits (ASICs) and/or field programmable gate arrays (FPGAs). The processor may be configured to execute the software in a specific manner FIG. 5 provides an example machine architecture with a processor that may be configured to execute software. It is noted that not all the components of FIG. 5 may be included in the aerial vehicle 110. FIG. 5 is intended to be illustrative in describing an architecture of a computing system, of which all or parts may operate within the aerial vehicle 110 for the control system 200.

The telemetric subsystem module 250 may include one or more sensors. The one or more sensors may be further grouped as sensor modules to gather particular types of data. For example, one sensor module may be for positional sensors and another sensor module may be for environmental sensors. Positional sensors may provide location and/or relative location in space and orientation information of the aerial vehicle 110. Positional sensors assist with navigation and location related operations of the aerial vehicle 110. Positional sensors may include, for example, gyroscopes, accelerometers, compasses, global positioning system (GPS) sensors, motion sensors, and/or altimeters. Environmental sensors may provide information of a particular environment. For example, environmental sensors may provide information on environmental conditions external to the housing 130 of the aerial vehicle 110. Further by example, environmental sensors may provide information on conditions within the housing 130 of the aerial vehicle 110. Environmental sensors may include, for example, temperature sensors, photodetectors, heat sensors, moisture sensors, and/or barometric sensors. It is noted that in some example instances, an environmental sensor may also operate as a positional sensor for purposes of how the data may be used and vice versa. For example, a barometric sensor may be used to determine atmospheric pressure and aerial vehicle 110 altitude. Note that other sensor configurations also may be included in addition to the examples given.

In various embodiments, the sensor data from the telemetric subsystem module 250 may be provided for display on a screen, for example, the screen 170 of the remote controller 120 or a screen of a computing device (e.g., laptop, smartphone, tablet, and/or desktop computer). Additionally, the sensor data from the telemetric subsystem module 250 may be provided to the flight subsystem 205 of the control system 200 for consideration.

The flight subsystem 205 may calculate and provide an input to the motor controller module 230 such that each thrust motor 145 can be driven to achieve the desired flight position and/or status. The flight subsystem 205 may further include an attitude controller module 215, a rate controller module 220, and a compensator module 300.

As depicted in FIG. 2, the flight subsystem 205 may consider data including flight input 210 (e.g., from a remote controller 120) as well as telemetric information from the telemetric subsystem module 250 in calculating the output that is provided to the motor controller module 230. In various embodiments, the information provided by the flight subsystem 205 to the motor controller module 230 includes calculated speeds for each thrust motor 145 of the aerial vehicle 110 that would enable the aerial vehicle 110 to achieve the desired flight position and/or status (e.g., that are specified by, or derived from, the flight input 210). Detailed description regarding each of the modules of the flight subsystem 205 is described further below.

The attitude controller module 215 of the flight subsystem 205 receives the flight input 210 from the remote controller 120 and converts the flight input 210 into feasible kinematic changes to the current flight status of the aerial vehicle 110. For example, the flight input 210 is converted into kinematic changes of translational and angular position, velocity, and acceleration of the aerial vehicle 110. In various embodiments, the flight input 210 may include a magnitude value that corresponds to the significance of a kinematic change to the current flight status of the aerial vehicle 110. For example, a large magnitude in the flight input 210 may correspond to a large kinematic change in velocity or acceleration as compared to a small magnitude in the flight input 210 which may correspond to a small kinematic change.

In various embodiments, each of the kinematic changes may be validated to ensure that a particular kinematic change does not cause the aerial vehicle 110 to fail (e.g., lose flight status). Therefore, the attitude controller module 215 may compare each of the kinematic changes to a threshold value that is pre-determined based on the physical parameters (e.g., overall weight, footprint, geometric dimensions) of the aerial vehicle 110. As an example, the attitude controller module 215 may receive a flight input 210 from the remote controller 120 that instructs the aerial vehicle 110 to roll in a particular direction. The attitude controller module 215 may determine the maximum allowable kinematic changes of the aerial vehicle 110 that can be maintained by the aerial vehicle 110 without failing. Additionally, the attitude controller module 215 determines whether the required kinematic changes to achieve the desired roll exceeds the maximum allowable kinematic changes and if so, scales back the required kinematic changes accordingly.

In various example embodiments, the attitude controller module 215 may further consider the environmental conditions that the aerial vehicle 110 is currently experiencing in setting the threshold values that determine the maximum allowable kinematic changes in the velocity and/or acceleration of the aerial vehicle 110. Information describing the environmental conditions may be originally captured by one or more sensors of the aerial vehicle 110 and provided as feedback to the attitude controller module 215 from the compensator module 300. As an example, if the aerial vehicle 110 is at high elevation, the density of air correspondingly decreases. As such, the attitude controller module 215 may further reduce the maximum allowable changes in velocity and/or acceleration given that it may be more difficult to change the flight status of the aerial vehicle 110 in less dense air. Other environmental conditions may also be considered by the attitude controller module 215 in setting the maximum allowable kinematic changes.

Alternatively or in addition to the feedback information that includes environmental conditions, feedback information from the compensator module 300 may be the maximum RPM of each propeller 140 or maximum torque that is applicable to each thrust motor 145 based on the current environmental conditions. Therefore, the attitude controller module 215 can update the pre-determined limits of the RPM of each propeller 140 such that further flight input 210 that is received from the remote controller 120 can be appropriately converted into feasible kinematic changes that correspond to a propeller 140 RPM that falls below the updated max RPM.

The rate controller module 220 may receive the validated kinematic changes from the attitude controller module 215 and may determine a desired torque vector that corresponds to the requested thrust, roll, pitch, and yaw of the aerial vehicle 110. For example, the desired torque vector may be a 4×1 vector expressed as:

$$F_r = \begin{bmatrix} T_r \\ R_r \\ P_r \\ Y_r \end{bmatrix}$$

where $T_r$, $R_r$, $P_r$, and $Y_r$ are the requested thrust, roll, pitch, and yaw, respectively. The requested thrust may be obtained directly from the attitude controller module 215. Thus, application of requested torque values would result in the validated kinematic changes in the aerial vehicle 110. In various embodiments the rate controller module 220 generates the desired torque vector $F_r$ independent of environmental conditions.

The compensator module 300 may receive the torque vector $F_r$ from the rate controller module 220 and may calculate the feasible rotational speeds (e.g., RPM) at which each thrust motor 145 of the aerial vehicle 110 needs to spin at in order to achieve the desired flight orientation/status. In various example embodiments, the compensator module 300 further may consider sensor data (e.g., environmental conditions) from the telemetric subsystem module 250 in calculating the feasible speeds for the thrust motors 145. As is described in further detail below, the compensator module 300 may employ an iterative process to ensure that the rotational speed of each thrust motor 145 is feasible and not beyond a maximum rotatable speed achievable by the thrust motor 145. The compensator module 300 may provide the calculated speed of each thrust motor 145 to the motor controller module 230.

As previously described, in various embodiments, the compensator module 300 may further provide feedback information to the attitude controller module 215 such that the attitude controller module 215 can appropriately limit the requested kinematic changes of the aerial vehicle 110. Such feedback information may include the data captured by one or more sensors and provided to the compensator module 300 by the telemetric subsystem module 250. Feedback information may also include the maximum RPM of each propeller 140 or maximum torque that is applicable to each thrust motor 145.

The motor controller module 230 may drive each thrust motor 145 that is coupled to a corresponding propeller 140 at a calculated speed provided by the compensator module 300. In various example embodiments, the motor controller module 230 may be embodied as firmware that communicates with electronics that are capable of controlling the speed applied to each thrust motor 145. In other example embodiments, the motor controller module 230 may be an electronic speed controller (ESC). Accordingly, in a scenario of a quadcopter aerial vehicle, there may be four motor controller modules 230, each configured to control the speed of a thrust motor 145 coupled with a propeller 140.

Calculating Motor Input to Achieve Flight Parameters

Figure 3:
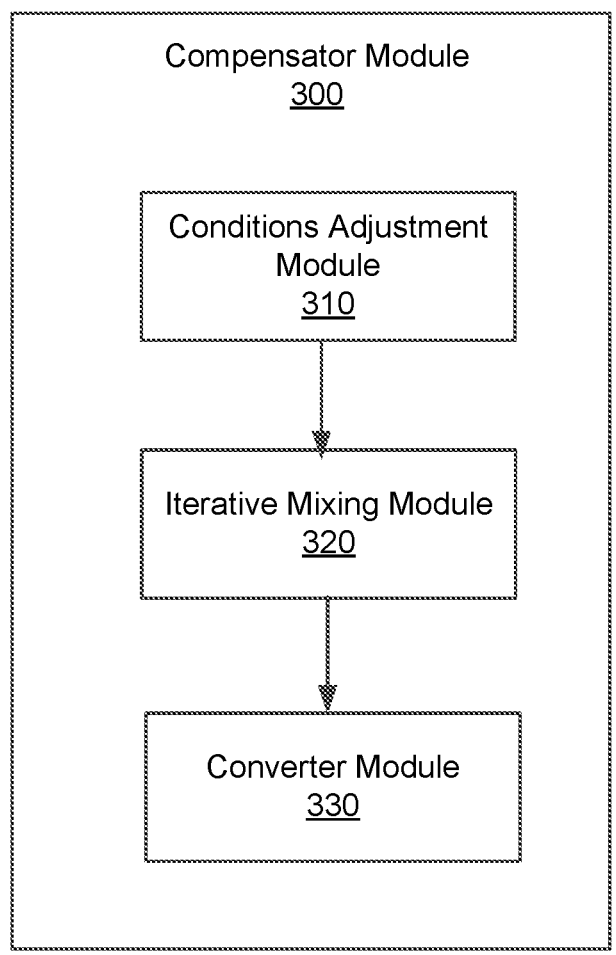
FIG. 3 illustrates an example block diagram and process flow of a compensator module of the flight controller, according to one example embodiment.

FIG. 3 illustrates an example block diagram and process flow of a compensator module 300 of the flight subsystem 200, according to one example embodiment. The compensator module 300 may include a conditions adjustment module 310, an iterative mixing module 320, and a converter module 330.

The conditions adjustment module 310 adjusts one or more factors based on the environmental conditions the aerial vehicle 110 is experiencing. For example, the conditions adjustment module 310 may adjust a thrust coefficient and a drag coefficient given an air pressure and air temperature that is detected by one or more sensors of the telemetric subsystem module 250. The coefficients may be further adjusted based on other environmental conditions such as humidity. For example, let $K_t$ be the thrust coefficient and $K_d$ be the drag coefficient. Both $K_t$ and $K_d$ are dependent on the density of the fluid (e.g., air) that the propellers 140 of the aerial vehicle 110 are rotating through. Furthermore, the density of the fluid may be dependent on the air pressure and air temperature. Therefore, the conditions adjustment module 310 may adjust $K_t$ and $K_d$ based on a difference of the current air pressure and temperature as compared to a standard air pressure and temperature.

As such, adjusted thrust coefficient $K_{ta}$ may be expressed as:

$$K_{ta}=K_t*X_{Temp}*X_{Pressure}$$

where $X_{Temp}$ and $X_{pressure}$ each represent correction constants for the thrust coefficient that are derived based on the air temperature and air pressure, respectively. As an example, if the aerial vehicle 110 is at high altitudes and is experiencing lower than standard air pressure, then $X_{pressure}<1$ scales the thrust coefficient accordingly to account for the lower thrust that would be generated at a lower air pressure. As another example, if the air temperature is higher than a standard air temperature, then $X_{Temp}<1$ which accounts for the lower density of air molecules at higher temperatures.

Similarly, adjusted drag coefficient $K_{da}$ may be expressed as:

$$K_{da}=K_d*Y_{Temp}*Y_{Pressure}$$

where $Y_{Temp}$ and $Y_{pressure}$ each represent correction constants for the drag coefficient that are derived based on the air temperature and air pressure, respectively. $Y_{Temp}$ and $Y_{Pressure}$ may scale similarly to $X_{Temp}*X_{Pressure}$. For example, when air pressure is lower than a standard pressure, then $Y_{Pressure}<1$, whereas when air temperature is higher than a standard temperature, $Y_{temp}<1$.

The conditions adjustment module 310 may further adjust limits of the thrust motor 145 and propeller 140 based on the detected environmental conditions. For example, a limit of the thrust motor 145 and propeller may be the maximum possible rotational speed maxRPM for a standard temperature, pressure, and humidity. As such, the adjusted maximum RPM maxRPM$_a$ may be calculated to be:

$$maxRPM_a=maxRPM*Z_{Temp}*Z_{pressure}$$

where $Z_{Temp}$ and $Z_{Pressure}$ each represent correction constants for the max RPM that are derived based on the air temperature and air pressure, respectively. For example, if the current temperature is above a standard temperature, then $Z_{Temp}<1$. In various embodiments, the limits of the thrust motor 145 and propeller 140 (e.g., the adjusted max RPM) is sent as feedback information to the attitude controller module 215 in order to limit the maximum RPM that each thrust motor 145 can spin a corresponding propeller 140. Other limits of the thrust motor 145 and propeller 140 may include the maximum/minimum applicable torque, angular acceleration/deceleration, and angular velocity.

The conditions adjustment module 310 also may adjust the torque vector $F_r$ received from the rate controller module 220 to account for the environmental conditions. Namely, if the air density is reduced (e.g., higher temperature and/or lower air pressure), then the conditions adjustment module 310 increases the torque values in the torque vector $F_r$ to compensate for the lower air density. For example, let $F_{ra}$ represent the adjusted torque vector, then $$F_{ra} = \begin{bmatrix} T_{ra} \\ R_{ra} \\ P_{ra} \\ Y_{ra} \end{bmatrix} = \begin{bmatrix} T_r * a_1 \\ R_r * a_2 \\ P_r * a_3 \\ Y_r * a_4 \end{bmatrix}$$

where $a_1$, $a_2$, $a_3$, and $a_4$ each represent a constant for adjusting each torque value.

The conditions adjustment module 310 may provide the adjusted values (e.g., adjusted coefficients ($K_{ta}$ and $K_{da}$), limits (maxRPM$_a$), and adjusted torque vector ($F_{ra}$)) to the iterative mixing module 320.

The iterative mixing module 320 uses the data from the conditions adjustment module 310 and calculates: 1) a mixer transfer matrix M and 2) an iterated torque vector $F_{it}$. In various example embodiments, the mixer transfer matrix M is represented as:

$$M = \begin{bmatrix} A_1 K_{ta} & B_1 K_{ta} & C_1 K_{ta} & D_1 K_{da} \\ A_2 K_{ta} & B_2 K_{ta} & C_2 K_{ta} & D_2 K_{da} \\ A_3 K_{ta} & B_3 K_{ta} & C_3 K_{ta} & D_3 K_{da} \\ A_4 K_{ta} & B_4 K_{ta} & C_4 K_{ta} & D_4 K_{da} \end{bmatrix}$$

where $A_N$, $B_N$, $C_N$, and $D_N$ represent constants calculated by the iterative mixing module 320 based on the geometry of the aerial vehicle (e.g., mechanical configuration, location of center of thrust, motor layout, and the like), and other intrinsic factors of the motor. More generally, the mixer transfer matrix is an N×4 matrix, wherein N is the total number of thrust motors 145 (corresponding to N propellers 140) on the aerial vehicle 110. Additionally, the mixer transfer matrix incorporates the adjusted thrust coefficient $K_{ta}$ and adjusted drag coefficient $K_{da}$. The mixer transfer matrix M represents a transfer matrix that, when multiplied with the iterated torque vector $F_{it}$, calculates the desired motor speeds for the thrust motors 245 of the aerial vehicle 110.

The iterated torque vector $F_{it}$ may be represented as:

$$F_{it} = \begin{bmatrix} T_{it} \\ R_{it} \\ P_{it} \\ Y_{it} \end{bmatrix}.$$

In various embodiments, each torque value in the iterated torque vector $F_{it}$ may be validated, meaning that each thrust motor 145 of the aerial vehicle 110 may feasibly achieve a speed that corresponds to the validated torque values $T_{it}$, $R_{it}$, $P_{it}$, $Y_{it}$.

Given that there is a finite amount of torque that can be applied (e.g., a max torque as determined by the conditions adjustment module 310), the torque values in the adjusted torque vector $F_{ra}$ may be processed to generate the iterated torque vector $F_{it}$ such that the torque values in the iterated torque vector $F_{it}$ do not exceed the finite amount of torque. To do so, the iterative mixing module 320 may scale down certain adjusted torque values that may be more amenable to being altered. In other words, the iterative mixing module 320 ensures that the scaled back torque values would not cause the aerial vehicle 110 to fail. As an example, the iterated torque value $Y_{it}$ may represent a scaled down version of adjusted torque value $Y_{ra}$.

To generate the iterated torque vector $F_{it}$, the iterative mixing module 320 divides each adjusted torque value $T_{ra}$, $R_{ra}$, $P_{ra}$, and $Y_{ra}$ from the adjusted torque vector $F_{ra}$ into multiple sub-torque values. As will be described hereafter, each adjusted torque value is divided into two sub-torque values; however, more sub-torque values for each adjusted torque value can be generated.

For example, the $T_{ra}$ value may be divided into a core thrust sub-torque, hereafter referred to as $T_c$ and a remaining thrust sub-torque, hereafter referred to as $T_{ra-c}$. The adjusted torque value represents the summation of its sub-torque values. Namely, $T_{ra} = T_c + T_{ra-c}.$ Similarly, each of the other adjusted torque values may be similarly divided. For example, sub-torque values for $R_{ra}$ can be represented as core roll sub-torque $R_c$ and remaining roll sub-torque $R_{ra-c}$. Adjusted torque value $P_{ra}$ is divided into $P_c$ and $P_{ra-c}$ whereas adjusted torque value $Y_{ra}$ is divided into $Y_c$ and $Y_{ra-c}$.

In various embodiments, each of the core sub-torque values (e.g., $T_c$, $R_c$, $P_c$, $Y_c$) represents the minimum amount of torque required to maintain a hover status for the aerial vehicle 110. For example, if the aerial vehicle 110 experiences a significant gust of wind, the core sub-torque values represent the minimum torque values corresponding to an applied thrust, roll, pitch, and yaw that would keep the aerial vehicle 110 in the air.

In various embodiments, the iterative mixing module 320 determines a priority order amongst the sub-torque values. The priority order represents the order in which the sub-torque values are fulfilled. This ensures that the most critical sub-torque values (e.g., to keep the aerial vehicle 110 from failing) are fulfilled first, whereas the less critical sub-torque values can be scaled back, if necessary, to ensure that the finite amount of torque is not exceeded. In one embodiment, the priority order is as follows: 1) $T_c$, 2) $P_c$, 3) $R_c$, 4) $P_{ra-c}$, 5) $R_{ra-c}$ 6) $Y_c$, 7) $T_{ra-c}$ and 8) $Y_{ra-c}$. Fulfilling the sub-torque values according to this priority order ensures that the aerial vehicle 110 maintains stability when margin is low. Other embodiments may rank the sub-torque values in a different priority order to achieve different strategies. Namely, the priority order can be based on the current operating environment.

The iterative mixing module 320 may initialize a temporary 4×1 matrix, represented as [Temp] and proceeds to iteratively add sub-torque values according to the determined priority order to generate the full iterated torque matrix $$F_{it} = \begin{bmatrix} T_{it} \\ R_{it} \\ P_{it} \\ Y_{it} \end{bmatrix}.$$

For each sub-torque value in the priority order, the iterative mixing module 320 validates that the sub-torque value is within a bounded range. For example, for core thrust sub-torque $T_c$, the iterative mixing module 320 ensures that $T_{c_{min}} < T_c < T_{c_{max}}$ where the bounds of the range may be pre-determined values that ensure that $T_c$ is not under allocated or exorbitantly allocated a portion of the finite torque value. The bounds also may be determined based on the portion of the finite torque that remains available to be allocated to that sub-torque value. If $T_c$ falls outside of the bounded range, the iterative mixing module 320 adjusts the value of $T_c$ to fall within the bounded range. As an example, if $T_c > T_{c_{max}}$, the iterative mixing module 320 may set $T_c = T_{c_{max}}$.

Once the sub-torque value has been validated, the iterative mixing module 320 may populate the temporary 4×1 matrix to include the sub-torque value. Therefore, after the first iteration of sub-torque value $T_c$, assuming that $T_{c_{min}} < T_c < T_{c_{max}}$:

$$[Temp] = \begin{bmatrix} T_c \\ 0 \\ 0 \\ 0 \end{bmatrix}.$$

The iterative mixing module 320 iterates subsequent sub-torque values according to the priority order by validating each sub-torque value and adding it to the temporary matrix. As an example, if following the aforementioned priority order, after the third iteration of sub-torque value $R_c$, the temporary matrix may read:

$$[Temp] = \begin{bmatrix} T_c \\ R_c \\ P_c \\ 0 \end{bmatrix}.$$

Given that the fourth sub-torque value in the priority order is the remainder roll sub-torque $R_{ra-c}$, the iterative mixing module 320 validates the sub-torque value $R_{ra-c}$, and adds it to the temporary matrix. If $R_{ra-c}$ falls within the bounded range, then it is unadjusted and the temporary matrix is then:

$$[Temp] = \begin{bmatrix} T_c \\ R_c + R_{ra-c} \\ P_c \\ 0 \end{bmatrix}.$$

The iterative mixing module 320 continues the iterative process according to the determined priority order. In various embodiments, the last sub-torque values (e.g., $T_{ra-c}$ and $Y_{ra-c}$) fall outside of their bounded ranges because a majority portion of the finite torque that can be applied was allocated to the previously iterated sub-torque values. Therefore, the last sub-torque values are scaled back accordingly. Thus, the iterative process ensures that the sub-torque values that are high on the priority order are likely to be fulfilled whereas the later or last iterations of sub-torque values can be potentially scaled back given the finite torque that can be applied.

Once the iterative mixing module 320 completes the iterative process according to the determined priority order, the iterated torque matrix $F_{it}$ may then be generated from the temporary matrix [Temp]. For example, the values in the temporary matrix are copied to the iterated torque matrix $F_{it}$. As such, the iterative mixing module 320 provides the iterated torque matrix $F_{it}$ as well as the generated mixer transfer matrix M to the converter module 330.

The converter module 330 converts the iterated torque matrix $F_{it}$ to generate the speed of each thrust motor 145 that corresponds to the torque values. As an example, the converter module 330 generates a rotational velocity vector $W_r$ which is represented as:

$$W_r = M * F_{it}$$

where $W_r$ is an N×1 vector representing the N motor speeds that each correspond to a thrust motor 145 of the aerial vehicle 110. Importantly, due to the iterative process in which the iterated torque vector $F_{it}$ was generated, each of the N motor speeds in the rotational velocity vector $W_r$ is a feasible rotational velocity that can be achieved by a thrust motor 145 and corresponding propeller 140. As previously described, the rotational velocity of each thrust motor 145 is provided to motor controller module 230 that is configured to individually control each thrust motor 145 of the aerial vehicle 110.

Figure 4:
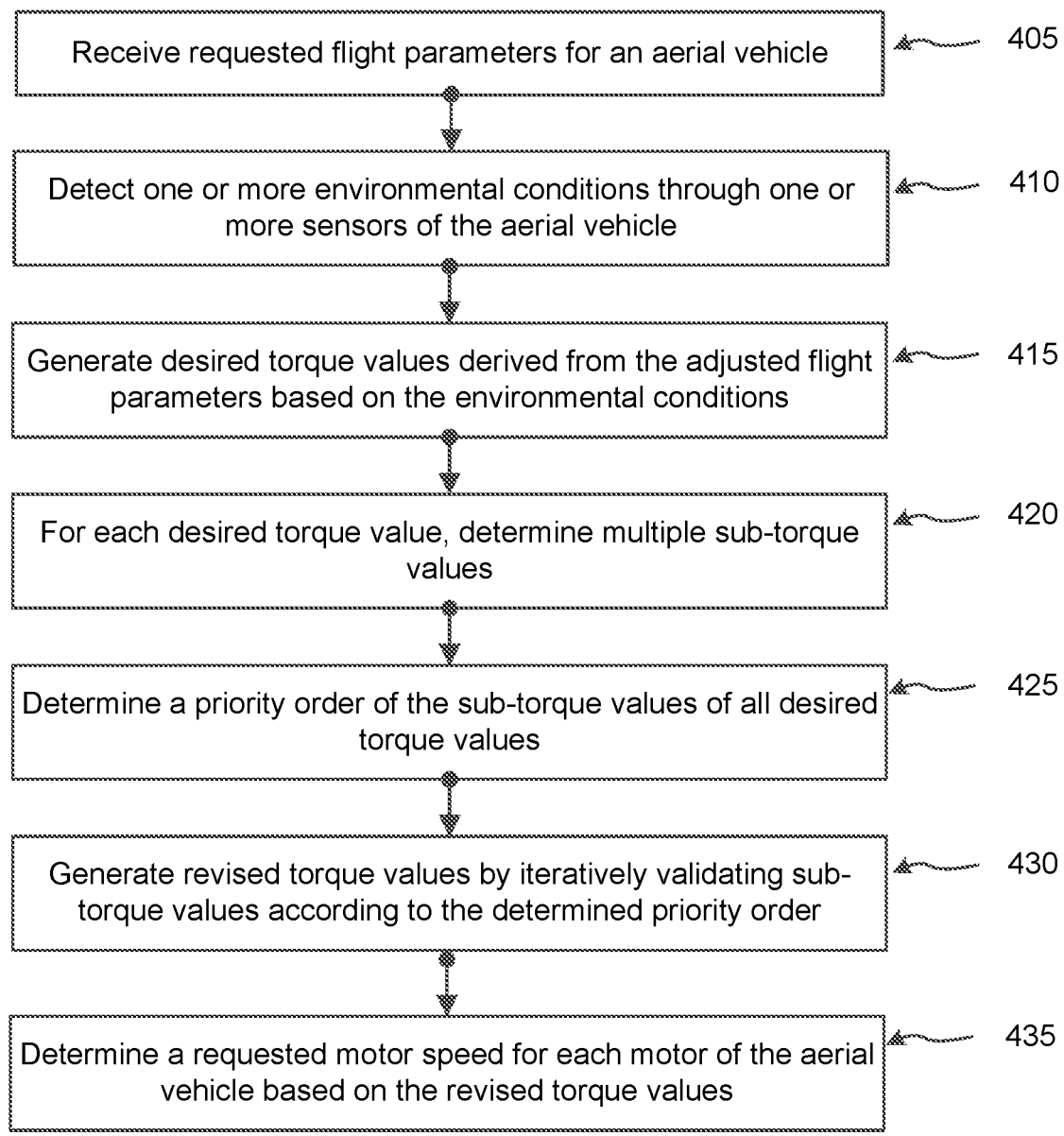
FIG. 4 illustrates a flow diagram of a method of determining feasible motor speeds in a current environmental setting through iterative mixing, according to one example embodiment.

FIG. 4 illustrates a flow diagram of a method 400 of determining feasible motor speeds in a current environmental setting through iterative mixing, according to one example embodiment. The aerial vehicle 110 receives 405 requested flight parameters for the aerial vehicle 110. As an example, the requested flight parameters may be a flight input 210 that originates from the remote controller 120.

In various embodiments, the aerial vehicle 110 may adjust the requested flight parameters based on limits. As an example, a predefined limit may be a maximum RPM of the thrust motor 145. If the requested flight parameters require a RPM that exceeds the maximum RPM, the aerial vehicle 110 adjusts the parameters accordingly. The aerial vehicle 110 detects 410, through sensors on the aerial vehicle 110, one or more environmental conditions external to the aerial vehicle 110. This may include the surrounding air pressure, air temperature, and humidity. The aerial vehicle 110 generates 415 desired torque values that each correspond to the flight parameters (or adjusted flight parameters) based on the detected environmental conditions. For example, desired torque values may be $F_{ra}$ that represents the adjusted torque vector.

For each desired torque value, the aerial vehicle 110 determines 420 multiple sub-torque values. Altogether, the multiple sub-torque values summate to the desired torque value. In various embodiments, one of the sub-torque values represents a core sub-torque value that corresponds to the minimum torque corresponding to one of thrust, roll, pitch, and yaw that is required to keep the aerial vehicle 110 from failing.

The aerial vehicle 110 determines 425 a priority order for the sub-torque values across all desired torque values. Thus, the aerial vehicle 110 generates 430 revised torque values (e.g., iterated torque vector $F_{it}$) by iteratively validating the sub-torque values according to the priority order. Using the revised torque values, the aerial vehicle determines 435 a requested motor speed for each thrust motor 145 of the aerial vehicle 110.

Example Machine Architecture

As has been noted, the remote controlled aerial vehicle 110 may be remotely controlled from the remote controller 120. The aerial vehicle 110 and the remote controller 120 are machines that may be configured and/or operated using software. FIG. 5 is a block diagram illustrating components of an example machine able to read instructions from a machine-readable medium (e.g., a non-transitory computer-readable storage medium) and execute them in one or more processors (or controllers). All or portions of the example machine described in FIG. 5 may be used with the aerial vehicle 110 or the remote controller 120 and/or other parts of a system that interfaces with the aerial vehicle 110 and/or remote controller 120.

In FIG. 5 there is a diagrammatic representation of a machine in the example form of a computing system 500. The computing system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a control system 200 of the aerial vehicle 110. However, the architecture described may be applicable to other computer systems that operate in the system of the remote controlled aerial vehicle with camera and mounting configuration, e.g., the remote controller 120 or computer used in setting up a local positioning system. These other example computer systems include a server computer, a client computer, a personal computer (PC), a tablet PC, a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a screen driver 510 (e.g., to drive screen, e.g., 170, such as a plasma display panel (PDP), a liquid crystal display (LCD), or a projector). The computer system 500 may also include input/output devices, e.g., an alphanumeric input device 512 (e.g., a keyboard), a dimensional (e.g., 2-D or 3-D) control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The control system, as described above, provides several advantages over conventional controller systems. For example, the control system accounts for current environmental conditions such that the aerial vehicle can effectively respond to an input (e.g., input from a controller, or an input from the environment) in view of the changing environmental conditions. As one example, the air density experienced by an aerial vehicle may change as the aerial vehicle changes in altitude. As the density of air molecules decrease, the propellers of the aerial vehicle generate a reduced amount of thrust at a given RPM as compared to the thrust generated by the propellers at a higher air density. The disclosed control system takes the environmental condition, such as the air density, into account to improve the efficiency of the aerial vehicle.

Secondly, the iterative process employed by the control system ensures that the input provided to each thrust motor is feasible and achievable. Thus, if a maximum RPM of a propeller coupled to the thrust motor is 10,000 RPM, then the control system ensures that the input provided to the thrust motor does not cause the thrust motor to exceed the 10,000 RPM limit. This prevents possible failure as well as possible malfunctioning of the hardware components of the aerial vehicle from occurring.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software (or program code)) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one example embodiment," or "an embodiment" means that a particular element, feature, structure, or characteristic described in connection with the embodiment is included in at least one embodiment. The appearances of the phrase "in one embodiment" or "in one example embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative modules a controller through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle, comprising:
   one or more motors;
   one or more sensors configured to detect data; and
   a flight sub-system comprising:
     an attitude controller module;
     a rate controller module; and
     a compensator module;

wherein the compensator module is configured to:
determine a maximum RPM of the one or more motors or a maximum torque of the one or more motors;
receive a torque vector from the rate controller module;
determine a rotational speed of the one or more motors to generate a desired flight orientation based upon the torque vector; and
consider sensor data from the one or more sensors to adjust the rotational speed of the one or more motors; wherein the rate controller module is in communication with the attitude controller module so that changes to the torque vector that are requested are compared to the maximum RPM of the one or more motors or the maximum torque of the one or more motors.

2. The aerial vehicle of claim 1, wherein the data comprises data indicative of environmental conditions including current or projected pressure, temperature, and humidity.

3. The aerial vehicle of claim 1, wherein the torque vector comprises thrust, roll, pitch, and yaw.

4. The aerial vehicle of claim 1, wherein the attitude controller module determines a maximum allowable kinematic change that can be maintained without the aerial vehicle losing flight status.

5. The aerial vehicle of claim 1, wherein the compensator module adjusts the one or more motors based upon feedback information that comprises the data of the one or more sensors.

6. A method of controlling an aerial vehicle performed by a flight subsystem, comprising:
detecting environmental conditions with one or more sensors;
determining a maximum RPM of one or more motors or a maximum torque of the one or more motors with a compensator module;
determining a torque vector with a rate controller module;
providing the torque vector from the rate controller module to the compensator module;
calculating a rotational speed of the one or more motors;
generating a desired flight orientation of the aerial vehicle based upon the torque vector;
adjusting the rotational speed of the one or more motors based upon the environmental conditions from the one or more sensors; and updating the maximum RPM of the one or more motors with an attitude controller module so that an RPM provided to the one or more motors falls below the maximum RPM.

7. The method of claim 6, wherein the environmental conditions include current or projected pressure, temperature, and humidity.

8. The method of claim 6, wherein the torque vector comprises thrust, roll, pitch, and yaw.

9. The method of claim 6, further comprising:
processing the rotational speed of the one or more motors iteratively so that the rotational speed of the one or more motors does not extend beyond the maximum RPM and to ensure that the rotational speed desired is achievable by the one or more motors.

10. The method of claim 6, further comprising:
providing feedback information from the compensator module to an attitude control module so that the attitude control module limits kinematic changes of the aerial vehicle.

11. The method of claim 10, wherein the kinematic changes comprise translational and angular position, velocity, and acceleration of the aerial vehicle.

12. The method of claim 11, further comprising:
validating every one of the kinematic changes to ensure that a desired kinematic change does not cause the aerial vehicle to lose a flight status.

13. An aerial vehicle comprising:
one or more motors;
one or more sensors configured to detect environmental conditions;
a flight control subsystem comprising:
a compensator module comprising:
a conditions adjustment module configured to adjust one or more factors of the one or more motors based upon the environmental conditions that are detected by the one or more sensors;
an iterative mixing module configured to adjust torque values associated with the one or more motors;
a converter module configured to change a speed of the one or more motors based upon the torque values from the iterative mixing module; and an attitude controller module that is configured to determine a maximum allowable kinematic change that can be maintained without the aerial vehicle losing flight status.

14. The aerial vehicle of claim 13, wherein the one or more factors of the one or more motors comprise a thrust coefficient and based upon an air pressure and air temperature that is detected by the one or more sensors the thrust coefficient is adjusted to control the aerial vehicle.

15. The aerial vehicle of claim 14, wherein the conditions adjustment module is further configured to adjust limits of the one or more motors based upon the environmental conditions detected.

16. The aerial vehicle of claim 15, wherein the limits of the one or more motors comprise a maximum RPM of the one or more motors.

17. The aerial vehicle of claim 13, wherein the iterative mixing module, when changing the speed, further reviews the adjusted speed to ensure that the adjusted speed does not exceed a predetermined amount of speed.

* * * * *